United States Patent
Gonze et al.

(10) Patent No.: US 9,599,011 B2
(45) Date of Patent: Mar. 21, 2017

(54) ELECTRIC COOLANT PUMP DIAGNOSTIC SYSTEMS AND METHODS

(71) Applicant: GM Global Technology Operations LLC, Detroit, MI (US)

(72) Inventors: Eugene V. Gonze, Pinckney, MI (US); Vijay Ramappan, Novi, MI (US); Yue-Ming Chen, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 14/495,265

(22) Filed: Sep. 24, 2014

(65) Prior Publication Data

US 2016/0047374 A1 Feb. 18, 2016

Related U.S. Application Data

(60) Provisional application No. 62/036,862, filed on Aug. 13, 2014.

(51) Int. Cl.
*F01P 11/18* (2006.01)
*F01P 11/14* (2006.01)
*F04B 51/00* (2006.01)
*G01F 15/00* (2006.01)

(52) U.S. Cl.
CPC ............ *F01P 11/18* (2013.01); *F01P 11/14* (2013.01); *F04B 51/00* (2013.01); *G01F 15/005* (2013.01)

(58) Field of Classification Search
CPC .... F01P 11/14; F01P 11/18; F01P 7/14; F01P 5/14; F01P 5/10; G05D 7/0635; G01F 15/005
See application file for complete search history.

(56) References Cited

U.S. PATENT DOCUMENTS

| | | | |
|---|---|---|---|
| 6,568,428 B2 | 5/2003 | Pecci et al. | |
| 6,994,316 B2 | 2/2006 | Pervaiz | |
| 2003/0019442 A1* | 1/2003 | Yoshikawa | F01P 7/167 123/41.1 |
| 2004/0035194 A1* | 2/2004 | Wakahara | F01P 11/16 73/114.71 |
| 2012/0296547 A1* | 11/2012 | Bialas | F01P 7/167 701/102 |
| 2015/0027572 A1 | 1/2015 | Morein et al. | |
| 2015/0053777 A1* | 2/2015 | Iwasaki | F01P 7/165 236/34.5 |

FOREIGN PATENT DOCUMENTS

| | | | |
|---|---|---|---|
| DE | 102013109365 A1 | | 3/2015 |
| JP | 2007023989 A | * | 2/2007 |
| JP | 2011089480 A | * | 5/2011 |
| JP | 2013194716 A | * | 9/2013 |

OTHER PUBLICATIONS

U.S. Appl. No. 14/494,904, filed Sep. 24, 2014, Gonze et al.
U.S. Appl. No. 14/495,037, filed Sep. 24, 2014, Gonze et al.
U.S. Appl. No. 14/495,141, filed Sep. 24, 2014, Gonze et al.

* cited by examiner

*Primary Examiner* — Daniel J Colilla

(57) ABSTRACT

A pump current module determines a first current flowing through an electric engine coolant pump based on a coolant valve position. A current error module receives a second current flowing through the electric engine coolant pump measured using a current sensor and determines a current error based on a difference between the first current and the second current. A fault module indicates whether a fault is present based on the current error.

18 Claims, 5 Drawing Sheets

ELECTRIC COOLANT PUMP DIAGNOSTIC SYSTEMS AND METHODS

CROSS-REFERENCE TO RELATED APPLICATIONS

This application claims the benefit of U.S. Provisional Application No. 62/036,862, filed on Aug. 13, 2014. The disclosure of the above application is incorporated herein by reference in its entirety.

This application is related to U.S. patent application Ser. No. 14/494,904, which is filed on the same day as this application and claims the benefit of U.S. Provisional Application No. 62/036,766 filed on Aug. 13, 2014; Ser. No. 14/495,037 filed on the same day as this application and claims the benefit of U.S. Provisional Application No. 62/036,814 filed on Aug. 13, 2014; and Ser. No. 14/495,141 filed on the same day as this application and claims the benefit of U.S. Provisional Application No. 62/036,833 filed on Aug. 13, 2014. The entire disclosures of the above applications are incorporated herein by reference.

FIELD

The present disclosure relates to vehicles with internal combustion engines and more particularly to diagnostic systems and methods for an electric engine coolant pump.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine combusts air and fuel within cylinders to generate drive torque. Combustion of air and fuel also generates heat and exhaust. Exhaust produced by an engine flows through an exhaust system before being expelled to atmosphere.

Excessive heating may shorten the lifetime of the engine, engine components, and/or other components of a vehicle. As such, vehicles that include an internal combustion engine typically include a radiator that is connected to coolant channels within the engine. Engine coolant circulates through the coolant channels and the radiator. The engine coolant absorbs heat from the engine and carries the heat to the radiator. The radiator transfers heat from the engine coolant to air passing the radiator. The cooled engine coolant exiting the radiator is circulated back to the engine.

SUMMARY

In a feature, a diagnostic system for a vehicle is disclosed. A pump current module determines a first current flowing through an electric engine coolant pump based on a coolant valve position. A current error module receives a second current flowing through the electric engine coolant pump measured using a current sensor and determines a current error based on a difference between the first current and the second current. A fault module indicates whether a fault is present based on the current error.

In further features, the fault module indicates that the fault is present when the current error is greater than a predetermined current.

In further features, the pump current module determines the first current flowing through the electric engine coolant pump further based on a speed of the coolant pump.

In further features, the pump current module determines the first current flowing through the electric engine coolant pump further based on an engine coolant temperature.

In further features, a backpressure module that determines a backpressure on the electric engine coolant pump based on the coolant valve position, wherein the pump current module determines the first current flowing through the electric engine coolant pump based on the backpressure.

In further features, the backpressure module determines the backpressure further based on at least one of: a position of a block valve that regulates coolant flow through a block portion of the engine; and a position of a heater valve that regulates coolant flow through a heater core.

In further features, a speed error module receives a speed of the electric engine coolant pump measured using a speed sensor and that determines a speed error based on a difference between the speed and a target speed for the electric engine coolant pump, and the fault module indicates whether the fault is present further based on the speed error.

In further features, the fault module indicates that the fault is present when at least one of: the speed error is greater than a predetermined speed; and the current error is greater than a predetermined current.

In further features, the fault module indicates that the fault is not present when the speed error is less than the predetermined speed and the current error is less than the predetermined current.

In further features, the fault module illuminates a malfunction indicator lamp when the fault is present.

A diagnostic method for a vehicle includes: determining a first current flowing through an electric engine coolant pump based on a coolant valve position; receiving a second current flowing through the electric engine coolant pump measured using a current sensor; determining a current error based on a difference between the first current and the second current; and indicating whether a fault is present based on the current error.

In further features, the diagnostic method further includes indicating that the fault is present when the current error is greater than a predetermined current.

In further features, the diagnostic method further includes determining the first current flowing through the electric engine coolant pump further based on a speed of the coolant pump.

In further features, the diagnostic method further includes determining the first current flowing through the electric engine coolant pump further based on an engine coolant temperature.

In further features, the diagnostic method further includes: determining a backpressure on the electric engine coolant pump based on the coolant valve position; and determining the first current flowing through the electric engine coolant pump based on the backpressure.

In further features, the diagnostic method further includes determining the backpressure further based on at least one of: a position of a block valve that regulates coolant flow through a block portion of the engine; and a position of a heater valve that regulates coolant flow through a heater core.

In further features, the diagnostic method further includes: receiving a speed of the electric engine coolant pump measured using a speed sensor; determining a speed error based on a difference between the speed and a target speed for the electric engine coolant pump; and indicating whether the fault is present further based on the speed error.

In further features, the diagnostic method further includes indicating that the fault is present when at least one of: the speed error is greater than a predetermined speed; and the current error is greater than a predetermined current.

In further features, the diagnostic method further includes indicating that the fault is not present when the speed error is less than the predetermined speed and the current error is less than the predetermined current.

In further features, the diagnostic method further includes illuminating a malfunction indicator lamp when the fault is present.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel to generate drive torque. A coolant system includes a coolant pump that circulates coolant through various portions of the engine, such as a cylinder head, an engine block, and an integrated exhaust manifold (IEM). Traditionally, the engine coolant is used to absorb heat from the engine, engine oil, transmission fluid, and other components and to transfer heat to air via one or more heat exchangers. A coolant valve controls how coolant flows back to the coolant pump and through various components.

A pump control module controls the coolant pump based on a target flowrate of coolant through the engine. More specifically, the pump control module determines a target speed of the coolant pump based on the target flowrate, and controls the application of electrical power to the coolant pump based on the target speed.

A diagnostic module according to the present disclosure diagnoses faults in coolant flow through the coolant pump. For example, the diagnostic module diagnoses the presence of a coolant flow fault when a difference between the target speed of the coolant pump and a measured speed of the coolant pump is greater than a predetermined speed. Additionally or alternatively, the diagnostic module diagnoses the presence of a coolant flow fault when a difference between a measured current flow through the coolant pump and an estimated current flow through the coolant pump is greater than a predetermined current.

Backpressure on the coolant pump varies with a position of the coolant valve affects, coolant flow through the coolant pump varies with the backpressure on the coolant pump. The diagnostic module therefore determines the estimated coolant flow through the coolant pump based on the position of the coolant valve. The diagnostic module may determine the estimated coolant flow based on one or more other parameters, such as the measured speed of the coolant pump and a temperature of the engine coolant.

Figure 1:
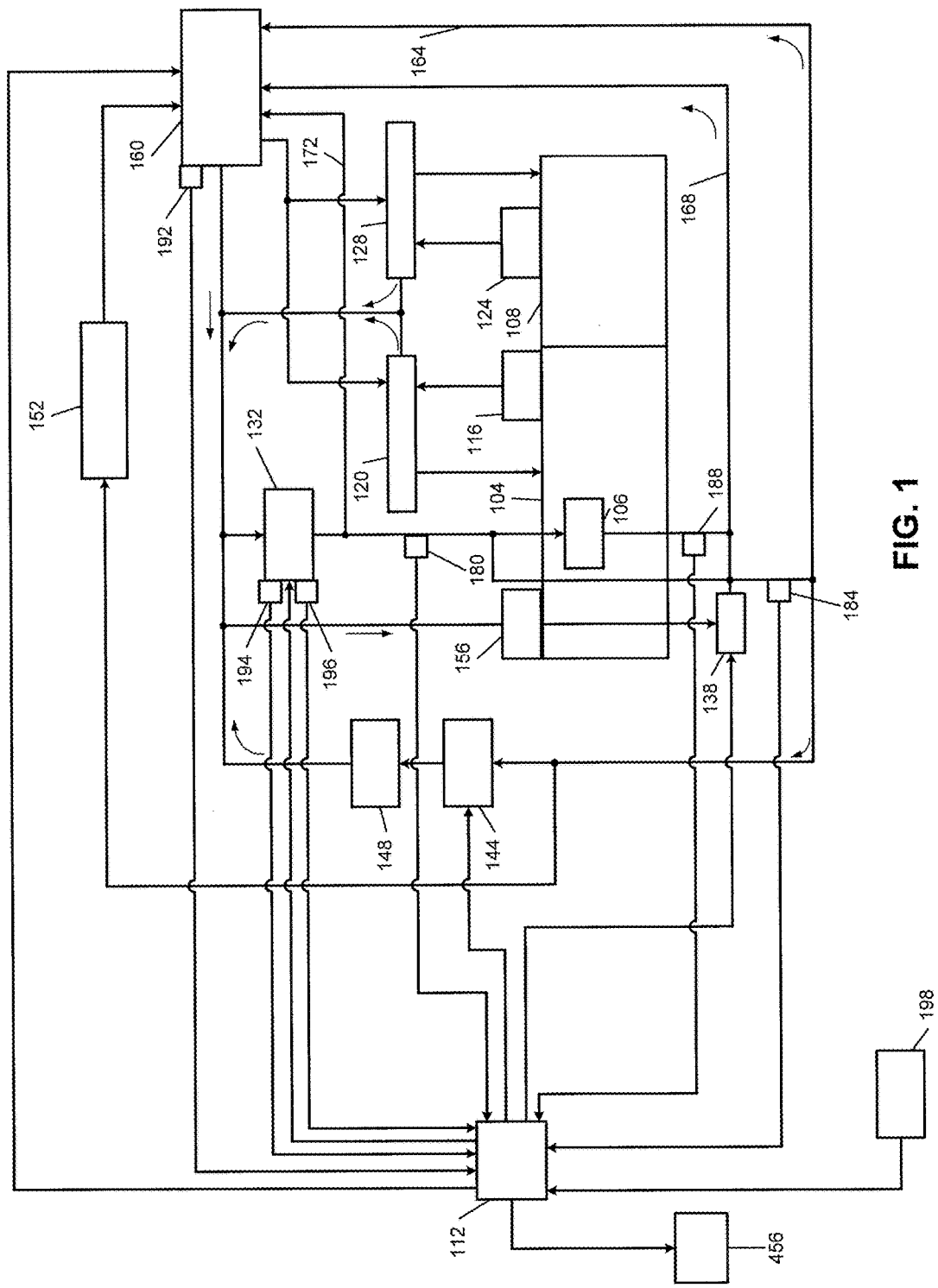
FIG. 1 is a functional block diagram of an example vehicle system.

Referring now to FIG. 1, a functional block diagram of an example vehicle system is presented. An engine 104 combusts a mixture of air and fuel within cylinders to generate drive torque. An integrated exhaust manifold (IEM) 106 receives exhaust output from the cylinders and is integrated with a portion of the engine 104, such as a head portion of the engine 104.

The engine 104 outputs torque to a transmission 108. The transmission 108 transfers torque to one or more wheels of a vehicle via a driveline (not shown). An engine control module (ECM) 112 may control one or more engine actuators to regulate the torque output of the engine 104.

An engine oil pump 116 circulates engine oil through the engine 104 and a first heat exchanger 120. The first heat exchanger 120 may be referred to as an (engine) oil cooler or an oil heat exchanger (HEX). When the engine oil is cold, the first heat exchanger 120 may transfer heat to engine oil within the first heat exchanger 120 from coolant flowing through the first heat exchanger 120. The first heat exchanger 120 may transfer heat from the engine oil to coolant flowing through the first heat exchanger 120 and/or to air passing the first heat exchanger 120 when the engine oil is warm.

A transmission fluid pump 124 circulates transmission fluid through the transmission 108 and a second heat exchanger 128. The second heat exchanger 128 may be referred to as a transmission cooler or as a transmission heat exchanger. When the transmission fluid is cold, the second heat exchanger 128 may transfer heat to transmission fluid within the second heat exchanger 128 from coolant flowing through the second heat exchanger 128. The second heat exchanger 128 may transfer heat from the transmission fluid to coolant flowing through the second heat exchanger 128 and/or to air passing the second heat exchanger 128 when the transmission fluid is warm.

The engine 104 includes a plurality of channels through which engine coolant ("coolant") can flow. For example, the engine 104 may include one or more channels through the head portion of the engine 104, one or more channels through a block portion of the engine 104, and/or one or more channels through the IEM 106. The engine 104 may also include one or more other suitable coolant channels.

When a coolant pump 132 is on, the coolant pump 132 pumps coolant to various channels. The coolant pump 132 is an electric coolant pump and pumps coolant based on electrical power applied to a motor of the coolant pump 132.

A block valve (BV) 138 may regulate coolant flow out of (and therefore through) the block portion of the engine 104. A heater valve 144 may regulate coolant flow to (and therefore through) a third heat exchanger 148. The third heat exchanger 148 may also be referred to as a heater core. Air may be circulated past the third heat exchanger 148, for example, to warm a passenger cabin of the vehicle.

Coolant output from the engine 104 also flows to a fourth heat exchanger 152. The fourth heat exchanger 152 may be referred to as a radiator. The fourth heat exchanger 152 transfers heat to air passing the fourth heat exchanger 152.

A cooling fan (not shown) may be implemented to increase airflow passing the fourth heat exchanger 152.

Various types of engines may include one or more turbochargers, such as turbocharger 156. Coolant may be circulated through a portion of the turbocharger 156, for example, to cool the turbocharger 156.

A coolant valve 160 may include a multiple input, multiple output valve or one or more other suitable valves. In various implementations, the coolant valve 160 may be partitioned and have two or more separate chambers. An example diagram illustrating coolant flow to and from an example where the coolant valve 160 includes 2 coolant chambers is provided in FIG. 2 and illustrates the coolant valve 160 if laid flat. The ECM 112 controls actuation of the coolant valve 160.

Figure 2:
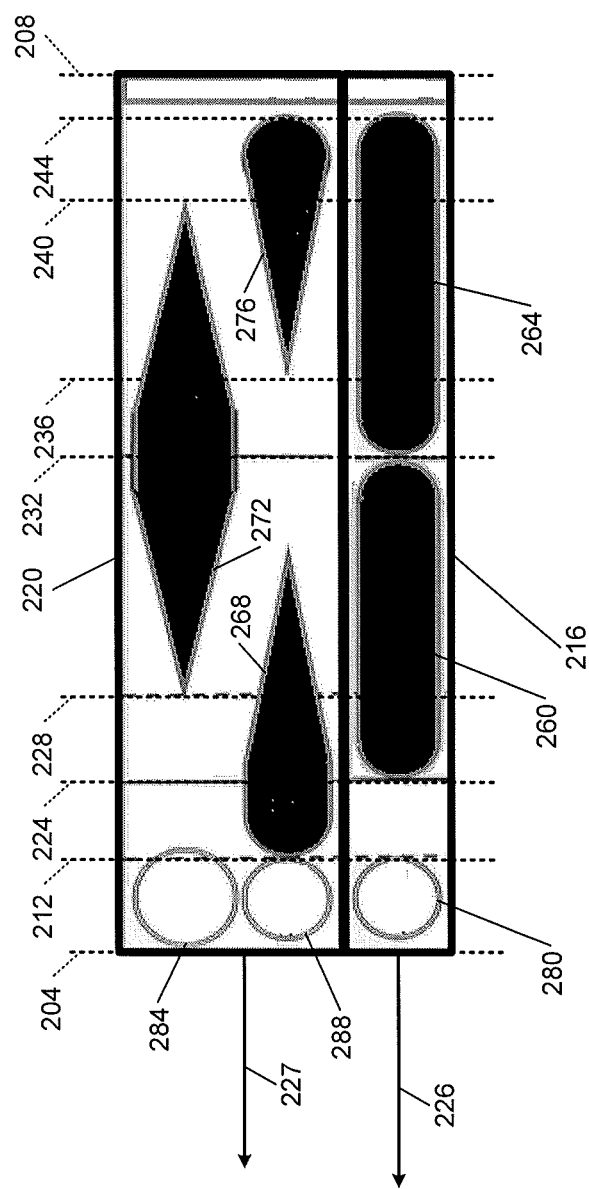
FIG. 2 is an example diagram illustrating coolant flow to and from a coolant valve for various positions of the coolant valve.

Referring now to FIGS. 1 and 2, the coolant valve 160 can be actuated between two end positions 204 and 208. When the coolant valve 160 is positioned between the end position 204 and a first position 212, coolant flow into a first one of the chambers 216 via 260 and 264 is blocked, and coolant flow into a second one of the chambers 220 via 268, 272, and 276 is blocked. The coolant valve 160 outputs coolant from the first one of the chambers 216 via 280 to the first heat exchanger 120 and the second heat exchanger 128 as indicated by 226. The coolant valve 160 outputs coolant from the second one of the chambers 220 to the coolant pump 132 via 284 and 288 as indicated by 227.

When the coolant valve 160 is positioned between the first position 212 and a second position 224, via 260 coolant flow into the first one of the chambers 216 is blocked and coolant output by the engine 104 flows into the second one of the chambers 220 via a first coolant path 164 and 268. Coolant flow into the second one of the chambers 220 from the fourth heat exchanger 152 and 272, however, is blocked.

When the coolant valve 160 is positioned between the second position 224 and a third position 228, coolant output by the IEM 106 via a second coolant path 168 flows into the first one of the chambers 216 via 260, coolant output by the engine 104 flows into the second one of the chambers 220 via the first coolant path 164 and 268, and coolant flow into the second one of the chambers 220 from the fourth heat exchanger 152 via 272 is blocked. The ECM 112 may actuate the coolant valve 160 to between the second and third positions 224 and 228, for example, to warm the engine oil and the transmission fluid.

When the coolant valve 160 is positioned between the third position 228 and a fourth position 232, coolant output by the IEM 106 via the second coolant path 168 flows into the first one of the chambers 216 via 260, coolant output by the engine 104 flows into the second one of the chambers 220 via the first coolant path 164 and 268, and coolant output by the fourth heat exchanger 152 flows into the second one of the chambers 220 via 272. Coolant flow into the first one of the chambers 216 from the coolant pump 132 via a third coolant path 172 and 264 is blocked when the coolant valve 160 is between the end position 204 and the fourth position 232. The ECM 112 may actuate the coolant valve 160 to between the third and fourth positions 228 and 232, for example, to warm the engine oil and the transmission fluid.

When the coolant valve 160 is positioned between the fourth position 232 and a fifth position 236, coolant output by the coolant pump 132 flows into the first one of the chambers 216 via the third coolant path 172 and 264, coolant flow into the second one of the chambers 220 via the first coolant path 164 and 268 is blocked, and coolant output by the fourth heat exchanger 152 flows into the second one of the chambers 220 via 272. When the coolant valve 160 is positioned between the fifth position 236 and a sixth position 240, coolant output by the coolant pump 132 flows into the first one of the chambers 216 via the third coolant path 172 and 264, coolant output by the engine 104 flows into the second one of the chambers 220 via the first coolant path 164 and 276, and coolant output by the fourth heat exchanger 152 flows into the second one of the chambers 220 via 272.

When the coolant valve 160 is positioned between the sixth position 240 and a seventh position 244, coolant output by the coolant pump 132 flows into the first one of the chambers 216 via the third coolant path 172 and 264, coolant output by the engine 104 flows into the second one of the chambers 220 via the first coolant path 164 and 276, and coolant flow from the fourth heat exchanger 152 into the second one of the chambers 220 via 272 is blocked.

Coolant flow into the first one of the chambers 216 from the IEM 106 via the second coolant path 168 and 260 is blocked when the coolant valve 160 is between the fourth position 232 and the seventh position 244. The ECM 112 may actuate the coolant valve 160 to between the fourth and seventh positions 232 and 244, for example, to cool the engine oil and the transmission fluid. Coolant flow into the first and second chambers 216 and 220 via 260, 264, 268, 272, and 276 is blocked when the coolant valve 160 is positioned between the seventh position 244 and the end position 208. The ECM 112 may actuate the coolant valve 160 to between the seventh position 244 and the end position 208, for example, for performance of one or more diagnostics.

Referring back to FIG. 1, a coolant input temperature sensor 180 measures a temperature of coolant input to the engine 104. A coolant output temperature sensor 184 measures a temperature of coolant output from the engine 104. An IEM coolant temperature sensor 188 measures a temperature of coolant output from the IEM 106.

A coolant valve position sensor 192 measures a position of the coolant valve 160. A pump speed sensor 194 measures a rotational speed of the coolant pump 132. A pump current sensor 196 measures current flow through the coolant pump 132. One or more other sensors 198 may be implemented, such as an oil temperature sensor, a transmission fluid temperature sensor, one or more engine (e.g., block and/or head) temperature sensors, a radiator output temperature sensor, a crankshaft position sensor, a mass air flowrate (MAF) sensor, a manifold absolute pressure (MAP) sensor, and/or one or more other suitable vehicle sensors. One or more other heat exchangers may also be implemented to aid in cooling and/or warming of vehicle fluid(s) and/or components.

Output of the coolant pump 132 varies as the pressure of coolant input to the coolant pump 132 varies. For example, at a given speed of the coolant pump 132, the output of the coolant pump 132 increases as the pressure of coolant input to the coolant pump 132 increases, and vice versa. The position of the coolant valve 160 varies the pressure of coolant input to the coolant pump 132. The pressure of coolant input to the coolant pump 132 may be referred to as backpressure.

Figure 3:
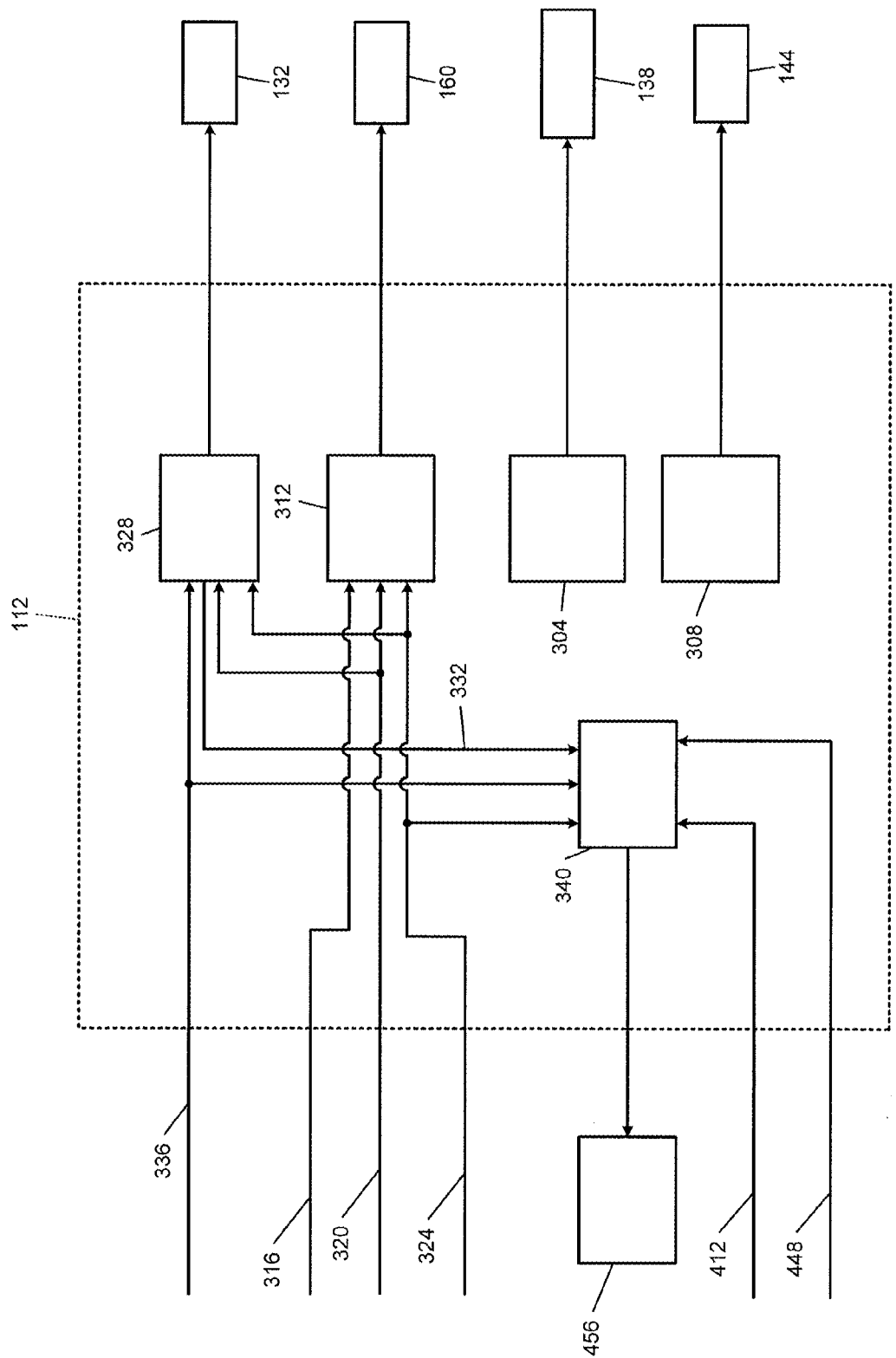
FIG. 3 is a functional block diagram of an example engine control module.

Referring now to FIG. 3, a functional block diagram of an example portion of the ECM 114 is presented. A block valve control module 304 controls the block valve 138. For example, the block valve control module 304 controls whether the block valve 138 is open (to allow coolant flow through the block portion of the engine 104) or closed (to prevent coolant flow through the block portion of the engine 104).

A heater valve control module 308 controls the heater valve 144. For example, the heater valve control module 308 controls whether the heater valve 144 is open (to allow coolant flow through the third heat exchanger 148) or closed (to prevent coolant flow through the third heat exchanger 148).

A coolant valve control module 312 controls the coolant valve 160. As described above, the position of the coolant valve 160 controls coolant flow into the chambers of the coolant valve 160 and also controls coolant flow out of the coolant valve 160. The coolant valve control module 312 may control the coolant valve 160, for example, based on an IEM coolant temperature 316, an engine coolant output temperature 320, an engine coolant input temperature 324, and/or one or more other suitable parameters. The IEM coolant temperature 316, the engine coolant output temperature 320, and the engine coolant input temperature 324 may be, for example, measured using the IEM coolant temperature sensor 188, the coolant input temperature sensor 180, and the coolant output temperature sensor 184, respectively.

A pump control module 328 controls the coolant pump 132. The pump control module 328 determines a target coolant flowrate through the engine 104, for example, based on an engine torque, an engine speed, the engine coolant input temperature 324, and the engine coolant output temperature 320. The engine speed may be, for example, measured using a sensor. The engine torque may be correspond to a requested engine torque output and may be determined, for example, based on one or more driver inputs, such as an accelerator pedal position and/or brake pedal position. Alternatively, the engine torque may correspond to a torque output of the engine and may be measured using a sensor or calculated based on one or more other parameters.

The pump control module 328 determines a target speed 332 of the coolant pump 132 based on the target coolant flowrate. The backpressure on the coolant pump 132 varies as a position 336 of the coolant valve 160 changes. The backpressure on the coolant pump 132 may also vary based on the position of the block valve 138 and/or the position of the heater valve 144. The pump control module 328 may therefore adjust the target speed 332 based on the position of the coolant valve 160, the position of the block valve 138, the position of the heater valve 144, and/or the backpressure.

The pump control module 328 controls the coolant pump 132 to achieve the target speed 332. For example, the pump control module 328 controls the application of electrical power to the motor of the coolant pump 132 to achieve the target speed 332.

Figure 4:
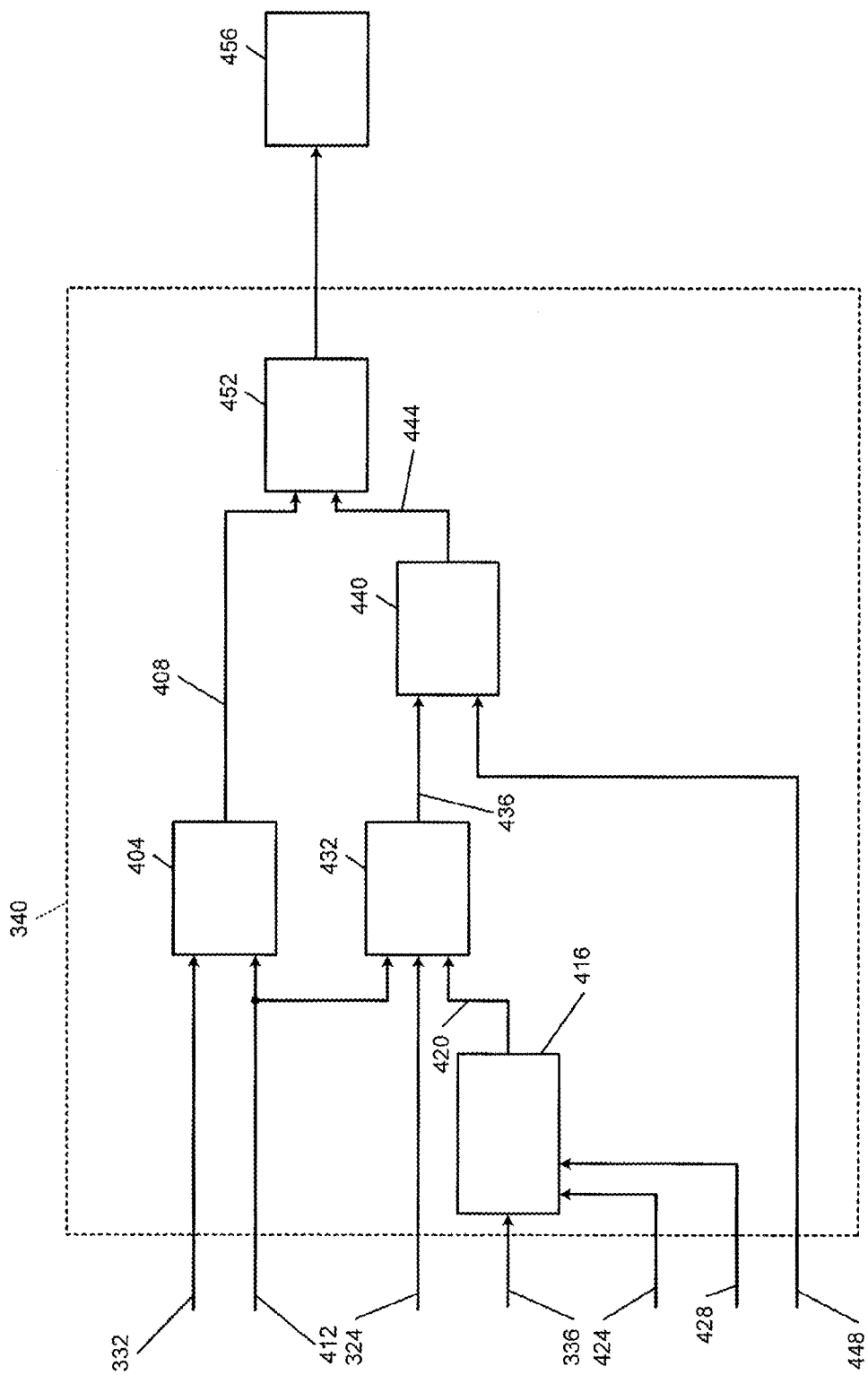
FIG. 4 is a functional block diagram of an example diagnostic module.

A diagnostic module 340 diagnoses faults in coolant flow through the coolant pump 132. FIG. 4 includes an example block diagram of the diagnostic module 340. Referring now to FIG. 4, a speed error module 404 determines a speed error 408. The speed error module 404 determines the speed error 408 based on a difference between the target speed 332 of the coolant pump 132 and a speed 412 of the coolant pump 132 measured using the pump speed sensor 194. For example, the speed error module 404 may set the speed error 408 equal to an absolute value of the result of the target speed 332 minus the pump speed 412.

A backpressure module 416 may determine a backpressure 420 of the coolant pump 132. The backpressure 420 corresponds to the pressure of coolant input to the coolant pump 132. The backpressure module 416 determines the backpressure 420 based on the position 336 of the coolant valve 160. The position 336 may be, for example, measured using the coolant valve position sensor 192. Alternatively, the position commanded by the coolant valve control module 312 may be used. The backpressure module 416 may determine the backpressure 420 using a function or a mapping that relates the position 336 of the coolant valve 160 to the backpressure 420.

The backpressure module 416 may determine the backpressure 420 further based on a position 424 of the block valve 138 and/or a position 428 of the heater valve 144. The backpressure module 416 may determine the backpressure 420 using one or more functions and/or mappings that relate the position 336 of the coolant valve 160, the position 424 of the block valve 138, and the position 428 of the heater valve 144 to the backpressure 420.

A pump current module 432 determines an estimated pump current 436. The estimated pump current 436 corresponds to an estimated value of current flow through the coolant pump 132. The pump current module 432 determines the estimated pump current 436 based on the pump speed 412 and a temperature of the engine coolant, such as the engine coolant input temperature 324. While the example of use of the engine coolant input temperature 324 is provided, the engine coolant output temperature 320 or another coolant temperature may be used.

The pump current module 432 may determine the estimated pump current 436 further based on the backpressure 420. For example, the pump current module 432 may determine the estimated pump current 436 using one or more functions and/or mappings that relate the pump speed 412, the coolant temperature, and the backpressure 420 to the estimated pump current 436.

In various implementations, the pump current module 432 may determine the estimated pump current 436 based on the position 336 of the coolant valve 160 in place of the backpressure 420. For example, the pump current module 432 may determine the estimated pump current 436 using one or more functions and/or mappings that relate the pump speed 412, the coolant temperature, and the position 336 of the coolant valve 160 to the estimated pump current 436. The pump current module 432 may determine the estimated pump current 436 further based on the position 428 of the heater valve 144 and/or the position 424 of the block valve 138. For example, the pump current module 432 may determine the estimated pump current 436 using one or more functions and/or mappings that relate the pump speed 412, the coolant temperature, the position 336 of the coolant valve 160 and one or more of the position 424 of the block valve 138 and the position 428 of the heater valve 144 to the estimated pump current 436.

A current error module 440 determines a current error 444 based on a difference between the estimated pump current 436 and a current 448 through the coolant pump 132 measured using the pump current sensor 196. For example, the current error module 440 may set the current error 444 equal to an absolute value of the result of the estimated pump current 436 minus the pump current 448.

A fault module 452 determines whether a coolant flow fault is present based on the speed error 408 and/or the current error 444. For example, the fault module 452 may determine that the coolant flow fault is present when the speed error 408 is greater than a predetermined speed. In this manner, the fault module 452 may determine that the coolant flow fault is present when the pump speed 412 is more than the predetermined speed above or below the target speed 332.

The fault module 452 may additionally or alternatively determine that the coolant flow fault is present when the current error 444 is greater than a predetermined current. In this manner, the fault module 452 may determine that the coolant flow fault is present when the pump current 448 is more than the predetermined current above or below the estimated pump current 436. The fault module 452 may determine that the coolant flow fault is not present when the current error 444 is less than the predetermined current and the speed error 408 is less than the predetermined speed.

The fault module 452 indicates whether the coolant flow fault is present. For example, the fault module 452 may set a predetermined diagnostic trouble code (DTC) that is associated with the coolant flow fault in memory when the coolant flow fault is present. The fault module 452 may also illuminate a malfunction indicator lamp (MIL) 456 when the coolant flow fault, is present. One or more other remedial actions may also be taken when the coolant flow fault is present, such as controlling the coolant pump 132 to achieve a maximum output.

Figure 5:
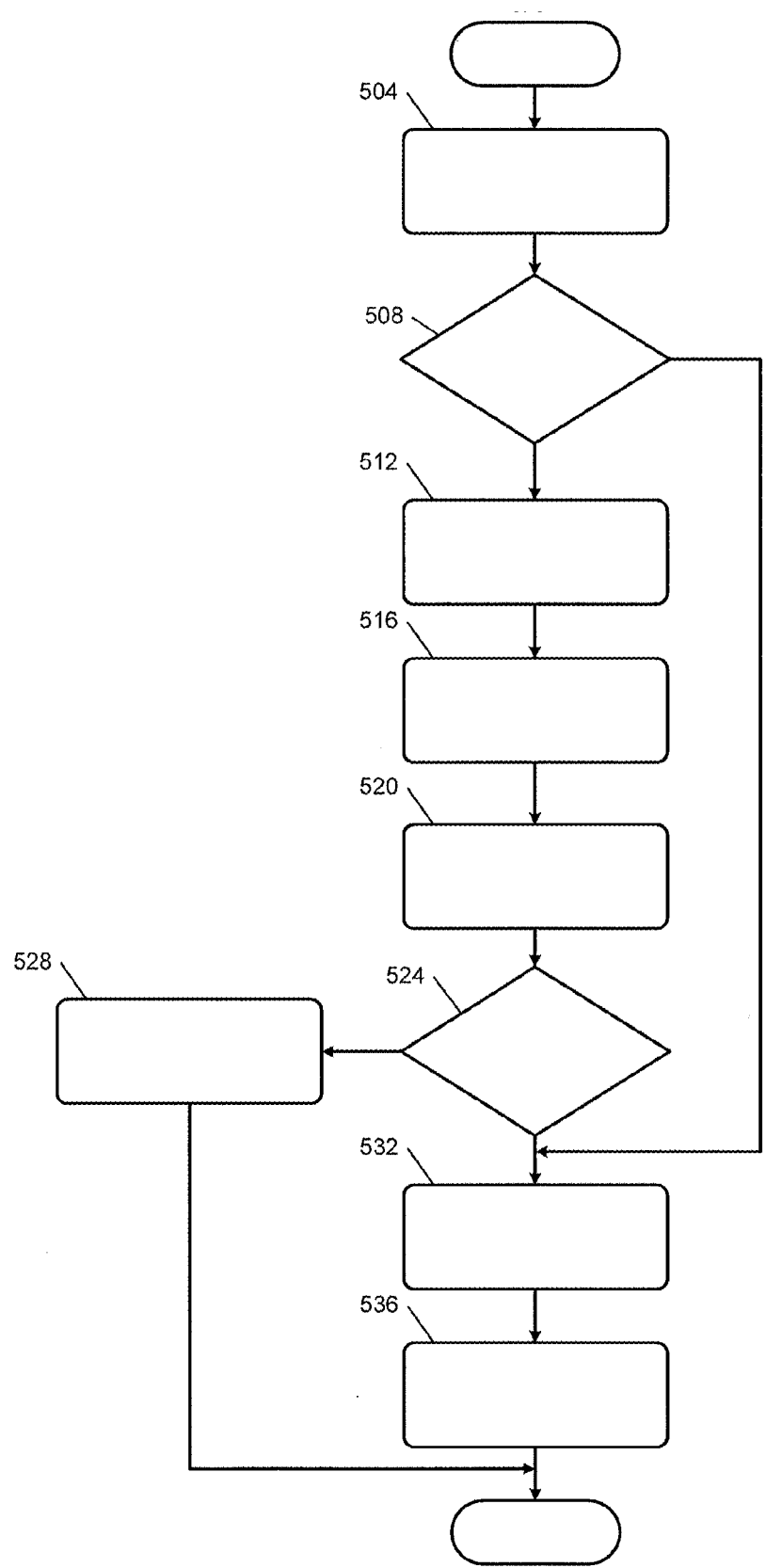
FIG. 5 is a flowchart depicting an example method of diagnosing faults in coolant flow.

FIG. 5 includes a flowchart depicting an example method of diagnosing whether the coolant flow fault is present. Referring now to FIG. 5, control begins with 504 where the speed error module 404 determines the speed error 408 based on a difference between the target speed 332 and the pump speed 412. At 508, the fault module 452 may determine whether the speed error 408 is greater than the predetermined speed. If 508 is true, control may transfer to 532, which is discussed further below. If 508 is false, control continues with 512.

At 512, the backpressure module 416 may determine the backpressure 420. The backpressure module 416 determines the backpressure 420 based on the position 336 of the coolant valve 160. The backpressure module 416 may determine the backpressure 420 further based on the position 424 of the block valve 138 and/or the position 428 of the heater valve 144.

The pump current module 432 determines the estimated pump current 436 at 516. The pump current module 432 may determine the estimated pump current 436 based on the coolant temperature (e.g., the engine coolant input temperature 324), the pump speed 412, and the backpressure 420. Alternatively, the pump current module 432 may determine the estimated pump current 436 based on the coolant temperature, the pump speed 412, and the position 336 of the coolant valve 160. In this case, the determination of the backpressure 420 may be omitted. The pump current module 432 may determine the estimated pump current 436 further based on the position 424 of the block valve 138 and/or the position 428 of the heater valve 144.

At 520, the current error module 440 determines the current error 444 based on a difference between the estimated pump current 436 and the pump current 448. The fault module 452 determines whether the current error 444 is greater than the predetermined current at 524. If 524 is false, the fault module 452 indicates that the coolant flow fault is not present at 528, and control may end. If 524 is true, control continues with 532.

At 532, the fault module 452 indicates that the coolant flow fault is present. The fault module 452 may, for example, set the predetermined DTC associated with the coolant flow fault in memory at 532. The fault module 452 may also illuminate the MIL 456. At 536, one or more remedial actions may be taken, such as controlling the coolant pump 132 to achieve the maximum output. While the example of FIG. 5 is shown as ending, FIG. 5 is illustrative of one control loop and may be performed iteratively.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, Smalltalk, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A diagnostic system for a vehicle comprising:
   a backpressure module that estimates backpressure at an inlet of an electric engine coolant pump based on a coolant valve position and a position of at least one other valve;
   a pump current module that determines a first current flowing through the electric engine coolant pump based on the estimated backpressure at the inlet of the electric coolant pump;
   a current error module that receives a second current flowing through the electric engine coolant pump measured using a current sensor and that determines a current error based on a difference between the first current and the second current; and
   a fault module that indicates whether a fault is present based on the current error.

2. The diagnostic system of claim 1 wherein the fault module indicates that the fault is present when the current error is greater than a predetermined current.

3. The diagnostic system of claim 1 wherein the pump current module determines the first current flowing through the electric engine coolant pump further based on a speed of the coolant pump.

4. The diagnostic system of claim 1 wherein the pump current module determines the first current flowing through the electric engine coolant pump further based on an engine coolant temperature.

5. The diagnostic system of claim 1 wherein the position of the at least one other valve includes at least one of:
   a position of a block valve that regulates coolant flow through a block portion of the engine; and
   a position of a heater valve that regulates coolant flow through a heater core.

6. The diagnostic system of claim 1 further comprising a speed error module that receives a speed of the electric engine coolant pump measured using a speed sensor and that determines a speed error based on a difference between the speed and a target speed for the electric engine coolant pump,
   wherein the fault module indicates whether the fault is present further based on the speed error.

7. The diagnostic system of claim 6 wherein the fault module indicates that the fault is present when at least one of:
   the speed error is greater than a predetermined speed; and
   the current error is greater than a predetermined current.

8. The diagnostic system of claim 7 wherein the fault module indicates that the fault is not present when the speed error is less than the predetermined speed and the current error is less than the predetermined current.

9. The diagnostic system of claim 1 wherein the fault module illuminates a malfunction indicator lamp when the fault is present.

10. A diagnostic method for a vehicle, comprising:
    estimating backpressure at an inlet of an electric engine coolant pump based on a coolant valve position and a position of at least one other valve;
    determining a first current flowing through the electric engine coolant pump based on the estimated backpressure at the inlet of the electric engine coolant pump;
    receiving a second current flowing through the electric engine coolant pump measured using a current sensor;
    determining a current error based on a difference between the first current and the second current; and
    indicating whether a fault is present based on the current error.

11. The diagnostic method of claim 10 further comprising indicating that the fault is present when the current error is greater than a predetermined current.

12. The diagnostic method of claim 10 further comprising determining the first current flowing through the electric engine coolant pump further based on a speed of the coolant pump.

13. The diagnostic method of claim 10 further comprising determining the first current flowing through the electric engine coolant pump further based on an engine coolant temperature.

14. The diagnostic method of claim 10, wherein the position of the at least one other valve includes at least one of:
    a position of a block valve that regulates coolant flow through a block portion of the engine; and
    a position of a heater valve that regulates coolant flow through a heater core.

15. The diagnostic method of claim 10 further comprising:
    receiving a speed of the electric engine coolant pump measured using a speed sensor;
    determining a speed error based on a difference between the speed and a target speed for the electric engine coolant pump; and
    indicating whether the fault is present further based on the speed error.

16. The diagnostic method of claim 15 further comprising indicating that the fault is present when at least one of:
    the speed error is greater than a predetermined speed; and
    the current error is greater than a predetermined current.

17. The diagnostic method of claim 16 further comprising indicating that the fault is not present when the speed error is less than the predetermined speed and the current error is less than the predetermined current.

18. The diagnostic method of claim 10 further comprising illuminating a malfunction indicator lamp when the fault is present.

\* \* \* \* \*